(12) United States Patent
Otsuka (10) Patent No.: US 8,162,393 B2
(45) Date of Patent: Apr. 24, 2012

(54) HEADREST

(75) Inventor: Taiyo Otsuka, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 328 days.

(21) Appl. No.: 12/548,658

(22) Filed: Aug. 27, 2009

(65) Prior Publication Data

US 2010/0052379 A1    Mar. 4, 2010

(30) Foreign Application Priority Data

Sep. 2, 2008    (JP) ................................ 2008-224624

(51) Int. Cl.
*B60N 2/42* (2006.01)
(52) U.S. Cl. .................. 297/216.12; 297/408
(58) Field of Classification Search ............. 297/216.12, 297/408
See application file for complete search history.

(56) References Cited

U.S. PATENT DOCUMENTS

| | | | |
|---|---|---|---|
| 6,000,760 A | 12/1999 | Chung | |
| 6,082,817 A * | 7/2000 | Muller | 297/216.12 |
| 6,688,697 B2 * | 2/2004 | Baumann et al. | 297/391 |
| 6,863,343 B2 * | 3/2005 | Pal et al. | 297/216.12 |
| 6,899,395 B2 * | 5/2005 | Yetukuri et al. | 297/408 |
| 7,048,334 B2 * | 5/2006 | Pal et al. | 297/216.12 |
| 7,070,235 B2 * | 7/2006 | Schilling et al. | 297/216.12 |
| 7,517,015 B2 | 4/2009 | Terada et al. | |
| 7,611,196 B2 * | 11/2009 | Terada et al. | 297/216.12 |
| 7,984,951 B2 * | 7/2011 | Sayama | 297/408 |
| 2005/0088027 A1 * | 4/2005 | Yetukuri et al. | 297/408 |
| 2007/0085400 A1 | 4/2007 | Terada et al. | |
| 2007/0246989 A1 * | 10/2007 | Brockman | 297/391 |
| 2009/0250981 A1 | 10/2009 | Matsui | |
| 2009/0322126 A1 | 12/2009 | Nishiura et al. | |

FOREIGN PATENT DOCUMENTS

| | | |
|---|---|---|
| DE | 102006035352 | 4/2007 |
| EP | 1491394 | 12/2004 |
| JP | 2007-106384 | 4/2007 |
| WO | 2008/026372 | 3/2008 |

OTHER PUBLICATIONS

English language Abstract of JP 2007-106384, Apr. 26, 2007.

* cited by examiner

*Primary Examiner* — David Dunn
*Assistant Examiner* — Erika Garrett
(74) *Attorney, Agent, or Firm* — Greenblum & Bernstein, P.L.C.

(57) ABSTRACT

A headrest includes a base member assembled to a seat back; a support plate assembled to the base member by a link mechanism; a lock mechanism which operates along with the link mechanism, whereupon the support plate springs out, a return prevention mechanism configured to prevent the support plate from returning to an initial position by a load imposed during the support plate springing out. The return prevention mechanism includes a ratchet including a step at an outer peripheral surface thereof, and a stopper rotatably attached to the base member to be capable of engaging with the step of the ratchet. The stopper is provided to be switchable between a first state in which the stopper is urged in a first rotating direction to engage with the step and a second state in which the stopper is urged in a second rotating direction opposite to the first rotating direction.

5 Claims, 9 Drawing Sheets

HEADREST

BACKGROUND OF THE INVENTION

1. Field of the Invention

The present invention relates to a headrest.

2. Description of the Related Art

A headrest which is called as an active headrest is configured such that a lock mechanism is unlocked when a vehicle is crashed from behind, and a link mechanism operates along with unlocking operation, whereupon the support plate springs out to receive the back of a passenger's head. Some active headrests have a return prevention mechanism which prevents or regulates, by means of a stopper, the support plate from returning to its initial position achieved before springing out, by a load imposed by the back of the passenger's head in the course of springing out of the support plate. By virtue of this mechanism, the support plate can be held at a position near the back of the passenger's head; and therefore, the back of the passenger's head can be reliably received.

JP-A-2007-106384 or U.S. Pat. No. 7,517,015 describes a related-art active headrest.

However, in the above-described headrest, when performing operation for returning the thus sprung out support plate to its initial position, the support plate cannot be returned to its initial position unless the regulation by the stopper is kept in a releasing state. Specifically, when performing the retuning operation, the operator has to return the support plate to its initial position by one hand while holding the stopper in the releasing state by the other hand. Since the operation requires both hands simultaneously, the operability of this returning operation is poor.

SUMMARY OF THE INVENTION

It is an aspect of the present invention to provide a headrest in which operation for returning a sprung support plate is easy, even when the headrest is configured such that a support plate springs out to receive the back of a passenger's head when a vehicle is crashed from behind and has a return prevention mechanism for preventing the support plate from returning to its initial position achieved before springing out, by a load imposed by the back of the passenger's head in the course of spring out of the support plate.

According to an exemplary embodiment of the present invention, there is provided a headrest comprising: a base member assembled to a seat back; a support plate assembled to the base member by a link mechanism; a lock mechanism which is unlocked when a vehicle is crashed from behind so that the link mechanism operates along with unlocking operation of the lock mechanism, whereupon the support plate springs out to receive a back of a passenger's head; a return prevention mechanism configured to prevent the support plate from returning to an initial position thereof achieved before the support plate springs out, by a load imposed by the back of the passenger's head during the course of the support plate springing out, wherein the return prevention mechanism includes: a ratchet including a step at an outer peripheral surface thereof, and a stopper rotatably attached to the base member to be capable of engaging with the step of the ratchet, and wherein the stopper is provided to be switchable between a first state in which the stopper is urged in a first rotating direction to engage with the step of the ratchet and a second state in which the stopper is urged in a second rotating direction opposite to the first rotating direction.

According to the above configuration, when the operation for returning the support plate is performed, the operator can hold the support plate without holding the support plate released from regulation by the stopper by one hand. Therefore, the operation does not require both hands. Accordingly, operability in return operation is improved. As a consequence, operation for returning the sprung-out support plate can be readily performed.

In the headrest, the stopper may include a hook portion, and after the support plate has sprung out, while performing an operation for returning the sprung-out support plate to the initial position thereof, by switching an urging direction to the stopper from the first rotating direction to the second rotating direction, the step of the ratchet may interfere with the hook portion of the stopper, whereupon the urging direction to the stopper switches from the second rotating direction to the first rotating direction.

According to the above configuration, the urging direction to the stopper can also be returned along with the operation for returning the support plate. Therefore, the operation for returning the stopper does not need to be separately performed.

In the headrest, the return prevention mechanism further may include a tension spring which urges the stopper switchably in the first rotating direction and the second rotating direction.

In the headrest, the tension spring may be hooked at an end of the stopper and applies an urging force in the urging direction, and the stopper may be attached to the based member rotatably about a rotation axis between the first state and the second state while a line extending in the urging direction from the end of the stopper at which the tension spring is hooked passes the rotation axis.

In the headrest, the stopper may have an operation section capable of switching the urging direction to the stopper from an outside of the base member.

According to this configuration, when the urging direction of the stopper is changed from the first rotating direction to the second rotating direction, switching can be performed by actuation of the operation section without use of; for instance, a tool, and the like. Therefore, switching operation can be readily performed.

DETAILED DESCRIPTION

Exemplary embodiments of the present invention will be described with reference to the drawings.

First Exemplary Embodiment

Figure 1:
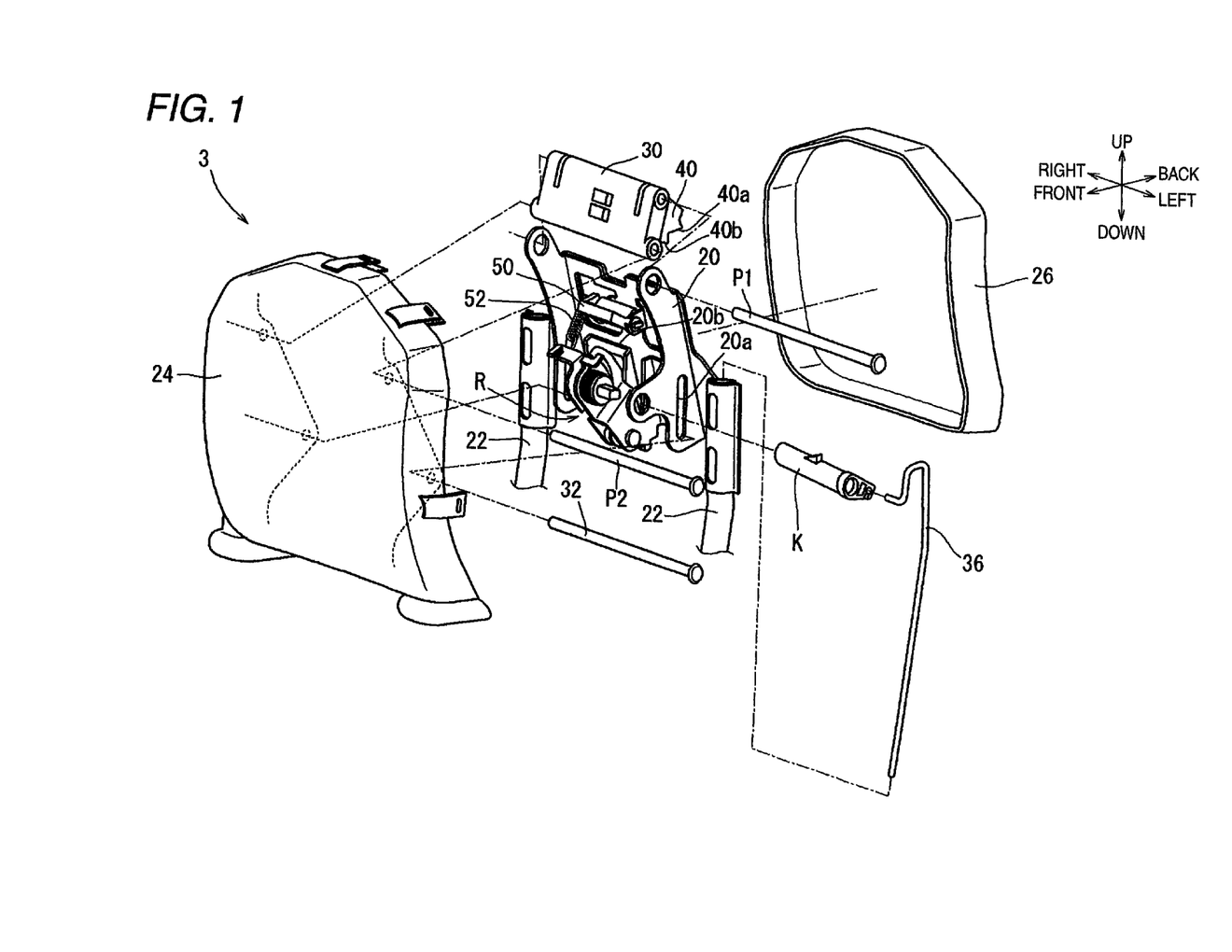
FIG. 1 is an exploded perspective view showing an internal structure of a headrest according to a first exemplary embodiment of the present invention.
Figure 2:
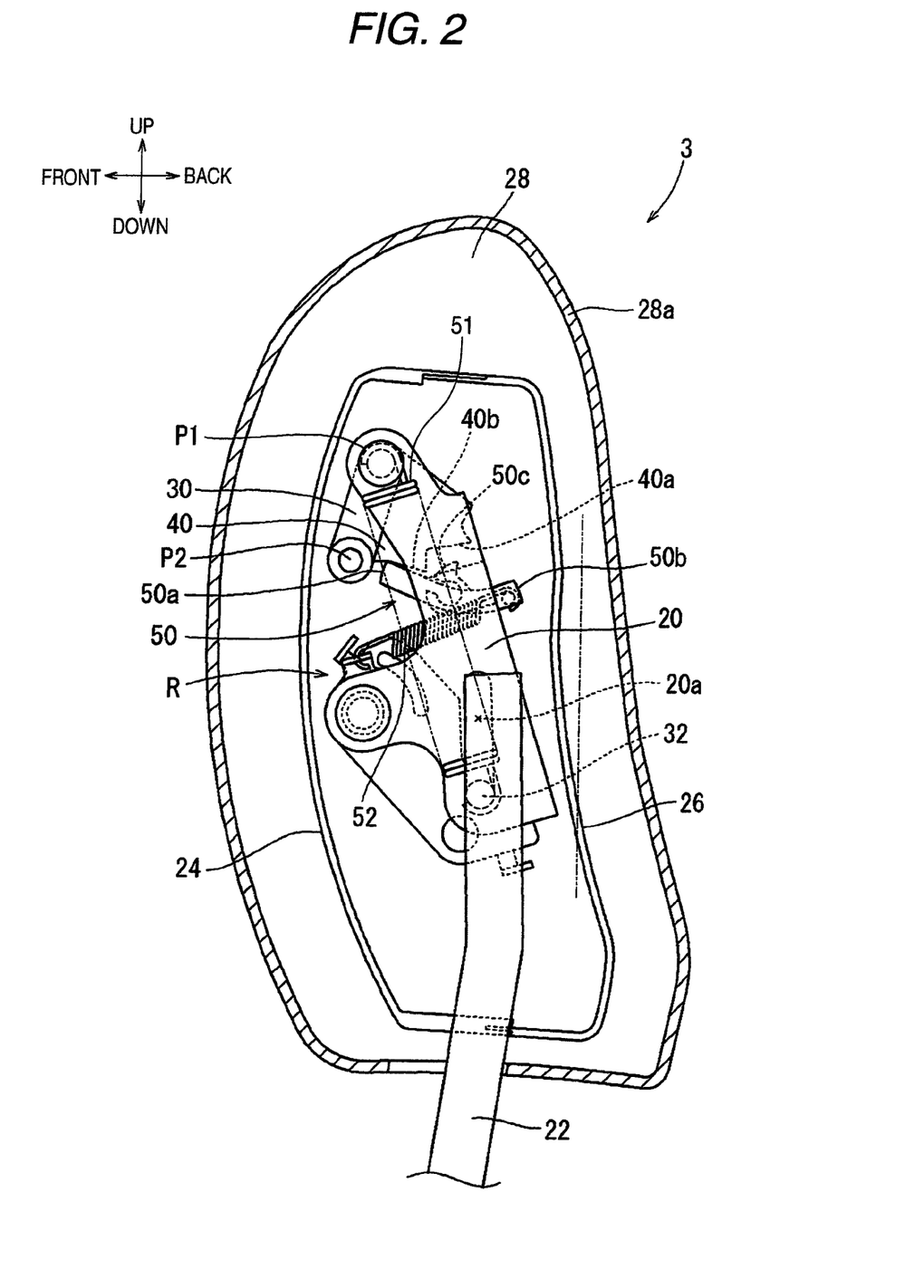
FIG. 2 is a side view showing a normal state of the head rest achieved in an assembled state shown in FIG. 1.
Figure 3:
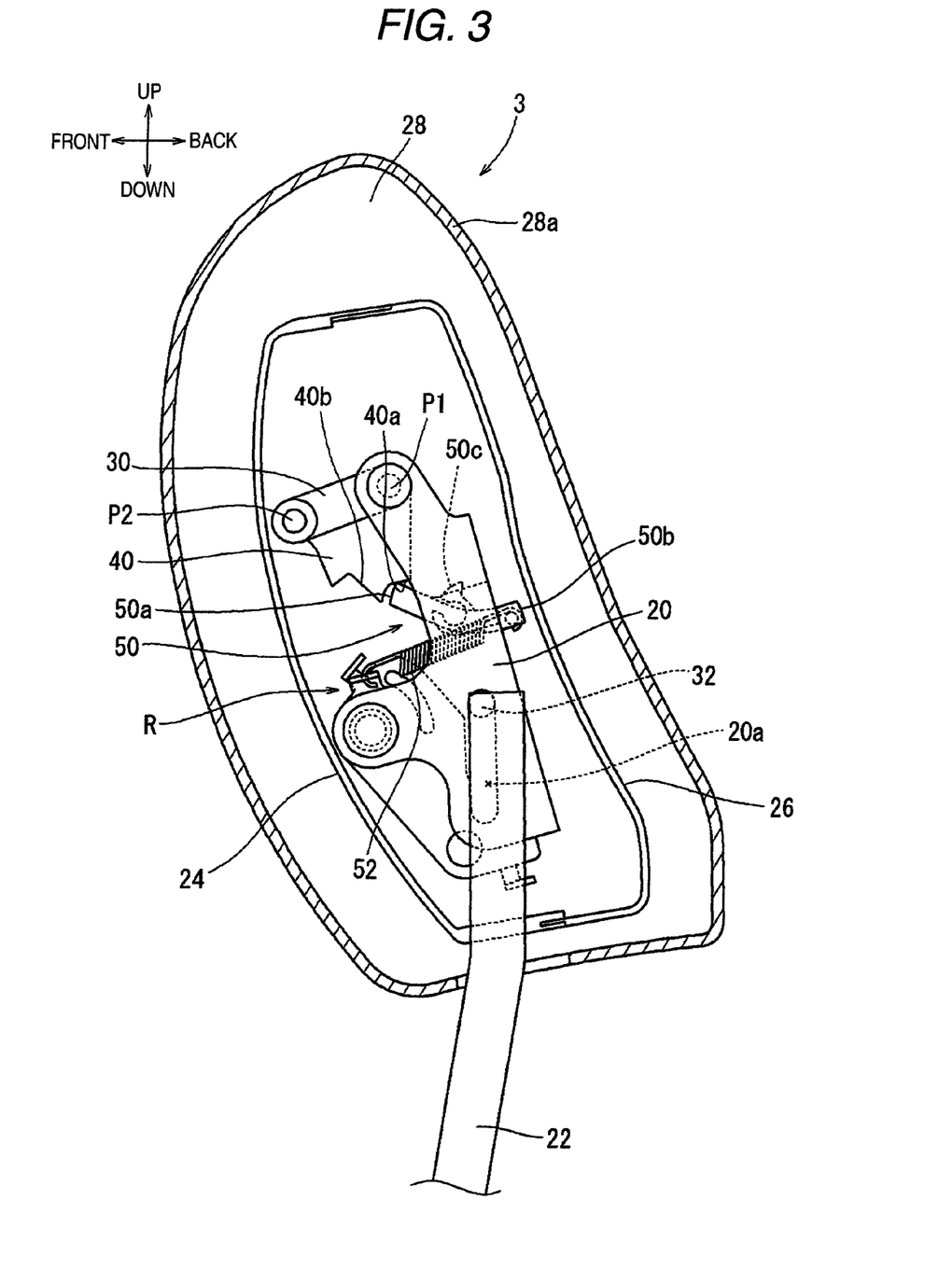
FIG. 3 is a side view showing a state achieved when a support plate has sprung out by a maximum extent as a result of a vehicle crashing from behind in FIG. 2.

First, a first exemplary embodiment of the present invention will be described by reference to FIGS. 1 through 8. FIG. 1 is an exploded perspective view showing the internal structure of a headrest according to the first exemplary embodiment; and FIG. 2 is a side view showing a normal state of the head rest achieved in an assembled state shown in FIG. 1. FIG. 3 is a side view showing a state achieved when a support plate has sprung out by a maximum extent as a result of a vehicle crashing from behind in FIG. 2.

Figure 4:
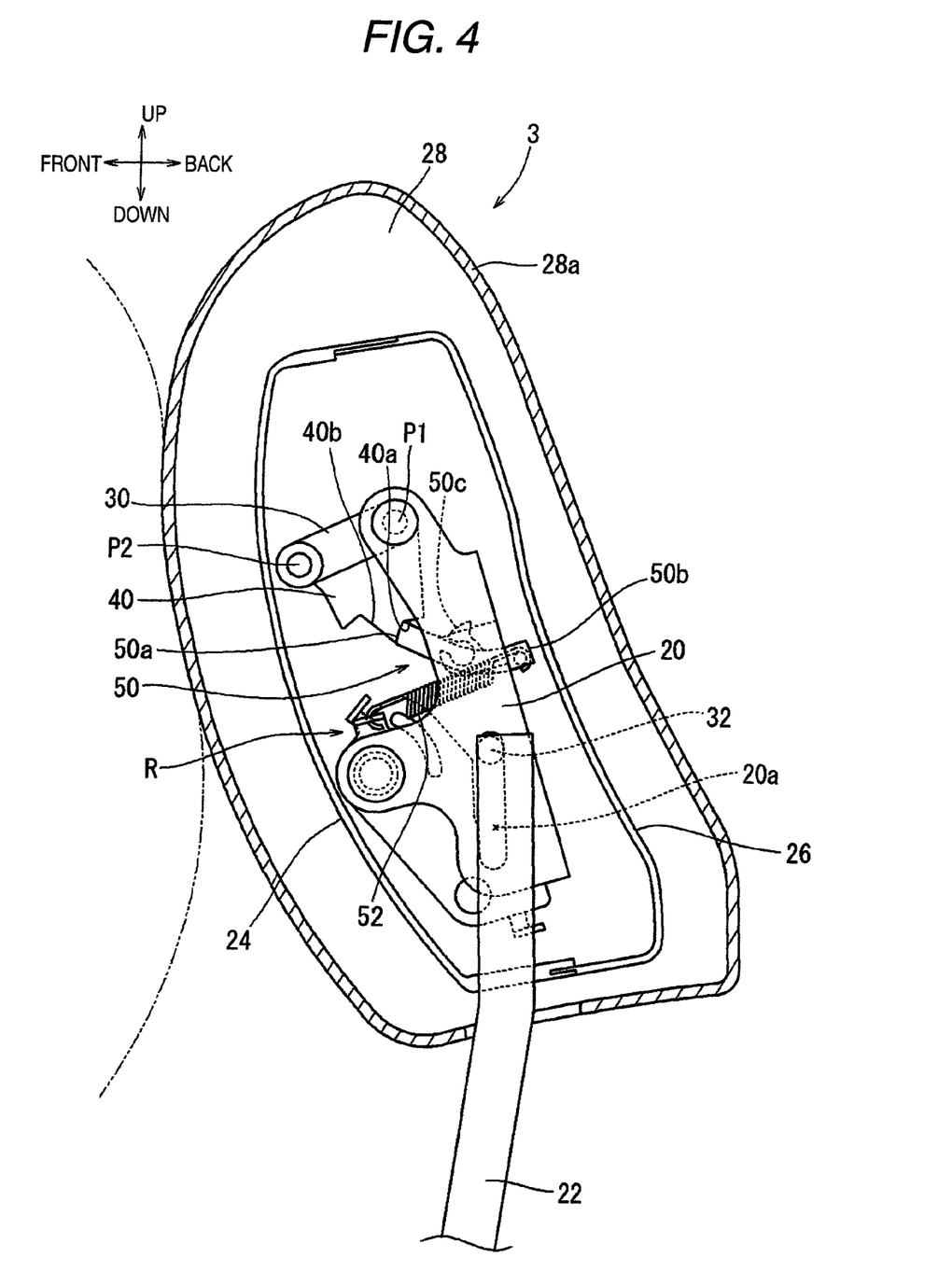
FIG. 4 is a side view showing a state achieved when a load is imposed on the support plate from the back of a passenger's head in FIG. 3.
Figure 5:
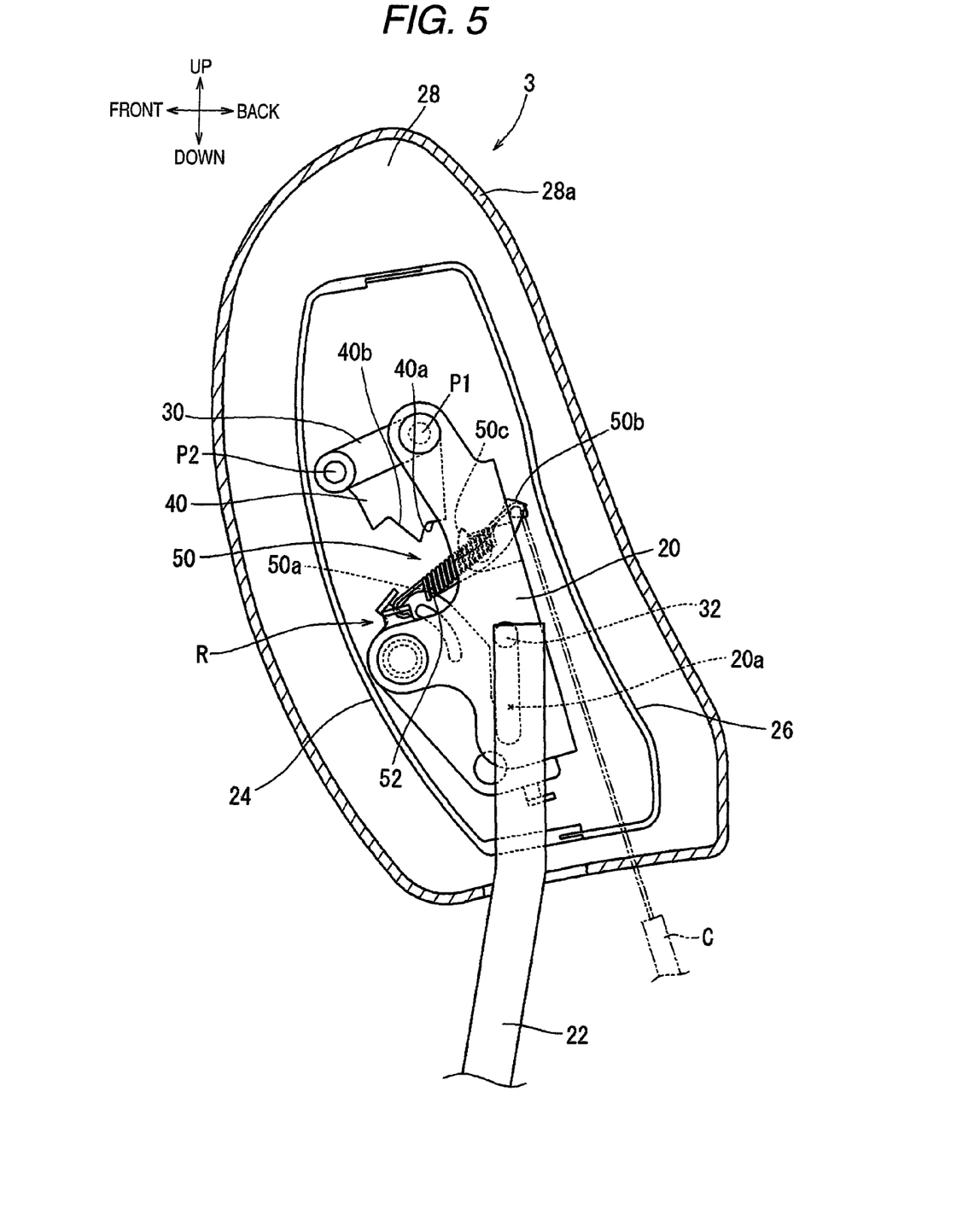
FIG. 5 is a side view showing a state achieved when the urging direction to the stopper is changed in FIG. 4.
Figure 6:
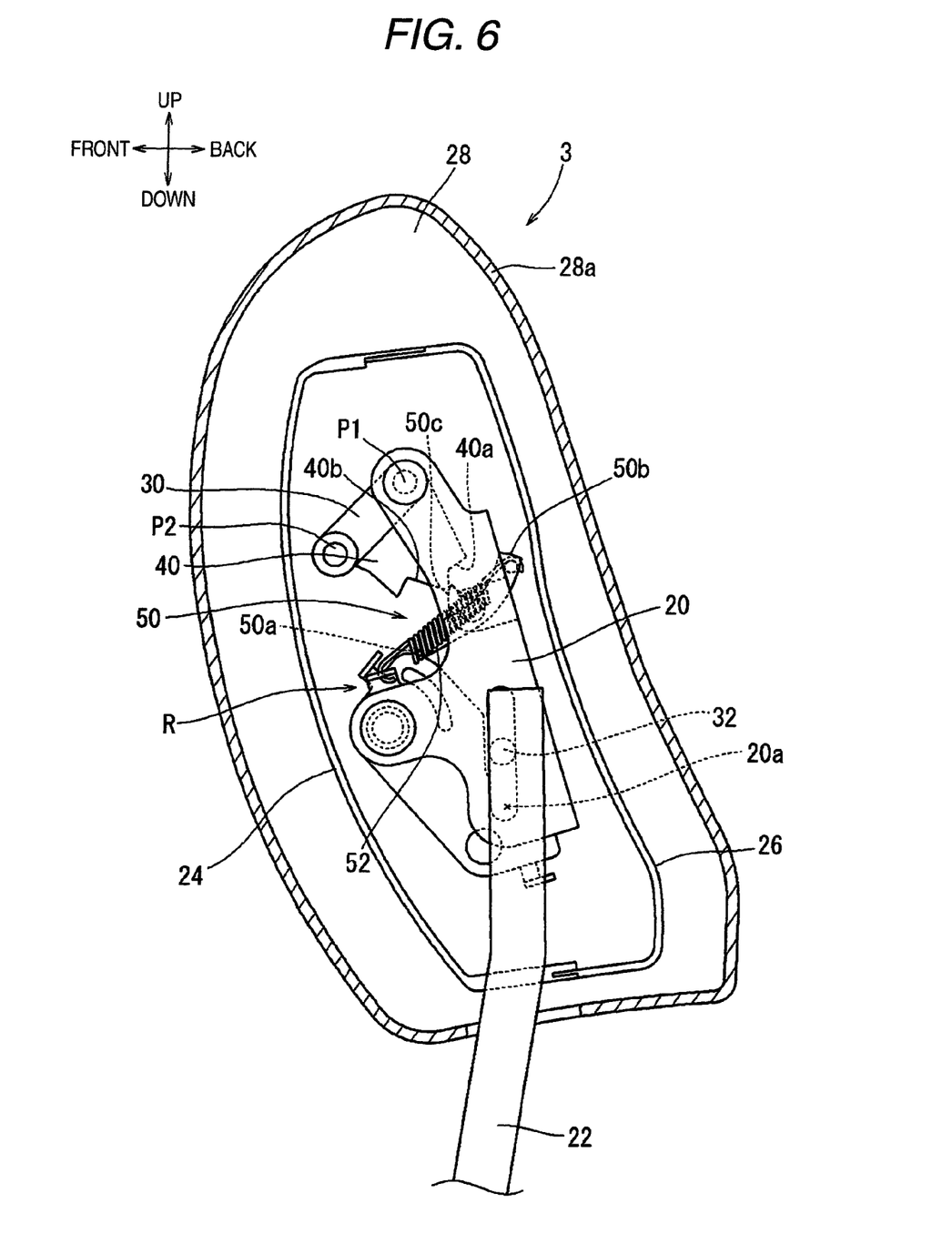
FIG. 6 is a side view showing a state achieved when steps of ratchets interfere with a hook portion of a stopper during the course of operation for returning the thus-sprung-out support plate in FIG. 5.
Figure 7:
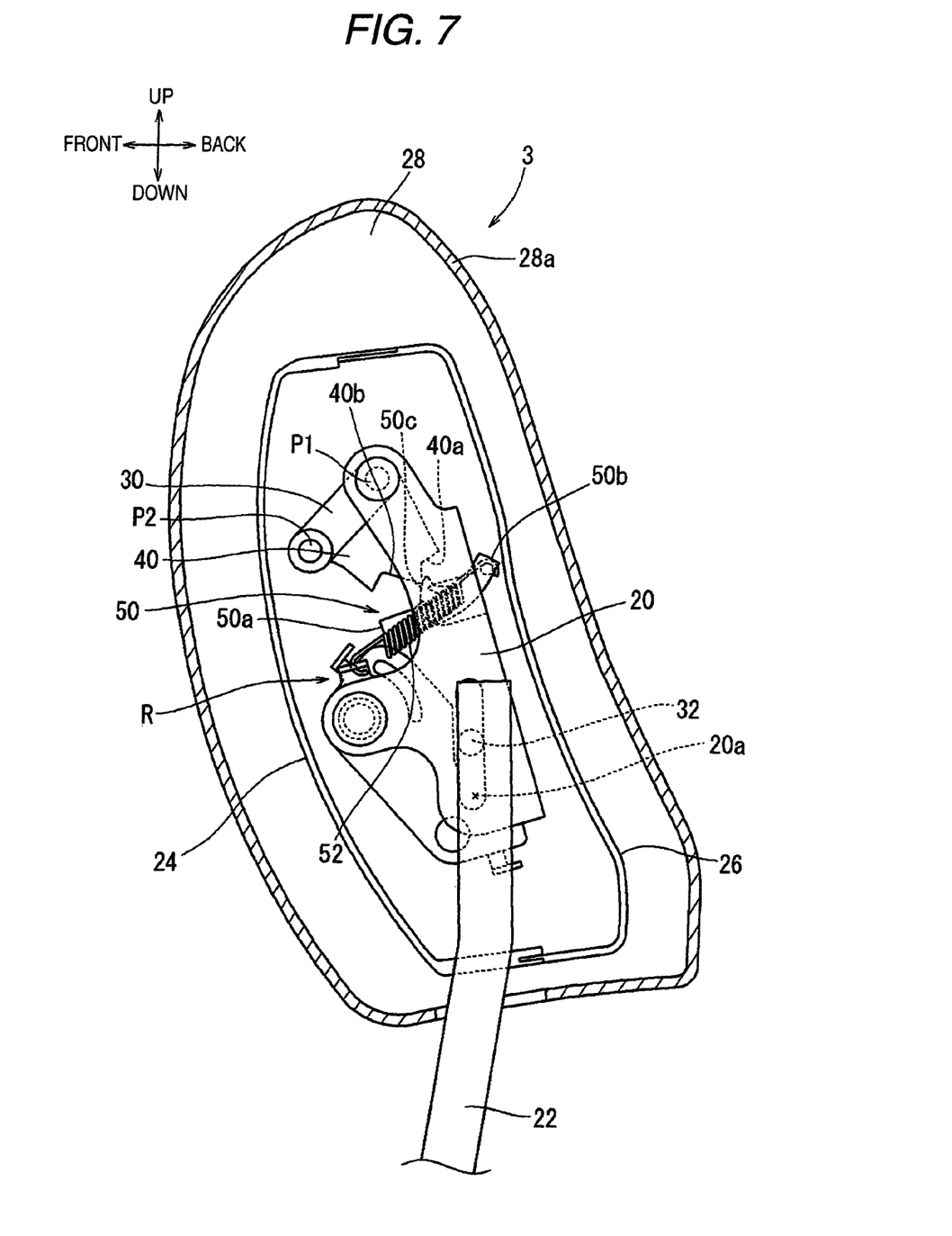
FIG. 7 is a side view showing a state achieved when returning of the urging direction to the stopper is commenced by the interference shown in FIG. 6.
Figure 8A:
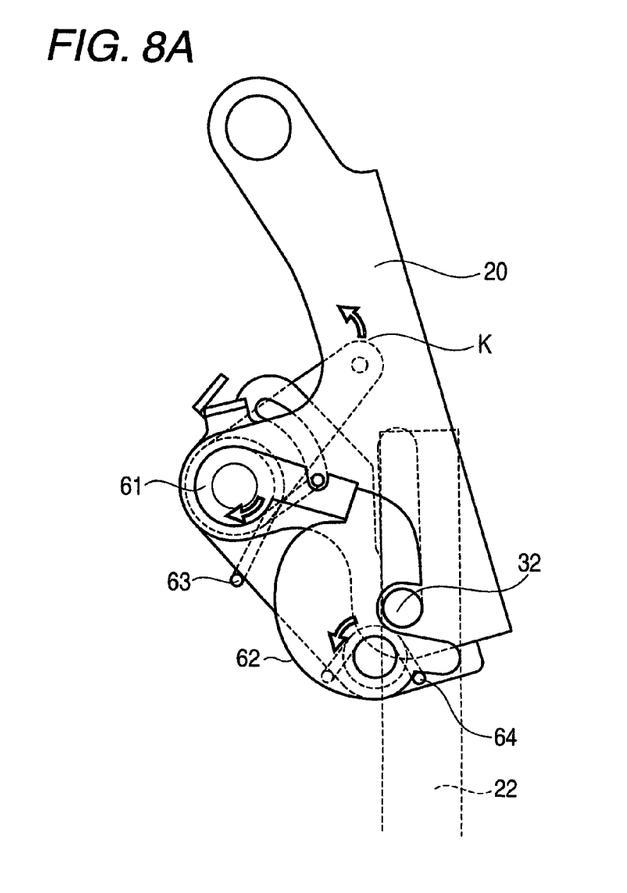
FIGS. 8A and 8B are side views showing a lock mechanism in the headrest.
Figure 8B:
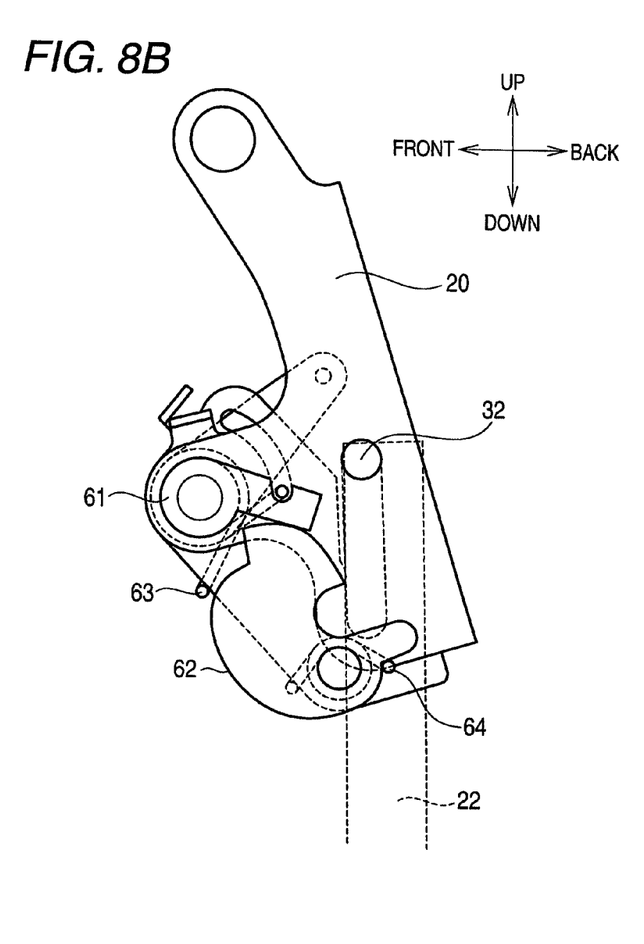

FIG. 4 is a side view showing a state achieved when a load is imposed on the support plate from the back of a passenger's head in FIG. 3. FIG. 5 is a side view showing a state achieved when the urging direction to the stopper is changed in FIG. 4. FIG. 6 is a side view showing a state achieved when steps of ratchets interfere with a hook portion of a stopper during the course of operation for returning the thus-sprung-out support plate in FIG. 5. FIG. 7 is a side view showing a state achieved when returning of the urging direction to the stopper is commenced by the interference shown in FIG. 6. FIGS. 8A and 8B are side views showing a lock mechanism in the headrest.

In order to make the understanding on the internal structure of a headrest 3 easy, a cushion structure and a surface structure of the headrest are omitted from FIG. 1, and only an internal frame structure of the headrest is shown in FIG. 1. In the following descriptions, the terms "up," "down," "front," "back," "left, and "right" refer to "up," "down," "front," "back," "left, and "right" directions provided in the respective drawings, respectively; that is, "up," "down," "front," "back," "left," and "right" directions based on the headrest 3.

First, the structure of the headrest 3 of the first exemplary embodiment of the present invention will be described by reference to FIG. 1. The headrest 3 includes a base member 20 constituting a base thereof; a pair of stays 22, 22 integrally assembled to the base member 20; a plate-like support plate 24 which covers the front surface of the base member 20 and which can receive the back of a passenger's head seated in a seat cushion (not shown); a rear cover 26 which covers the back of the support plate 24; a pad member 28 (not shown) assembled to wrap the support plate 24 and the rear cover 26; and a cover member 28a (not shown) which covers the pad member 28.

Since the headrest is configured as described above, the rear cover 26 and the pad member 28 are integrated with the support plate 24. Therefore, it is noted that even when describing the spring out of the support plate 24 in the following, the rear cover 26 and the pad member 28 also spring out in conjunction with the support plate 24 in an integrated manner.

Among constituent members of the headrest 3, the pair of stays 22 and 22 will now be described. The pair of stays 22 and 22 have tubular shape. The stays 22, 22 are inserted into a pair of supports (not shown) provided in a seat back, whereby the headrest 3 can be assembled into the seat back. Further, a rod 36 is inserted into; for example, the left stay 22.

The rod 36 is inserted into the left stay 22 while an upper end of the rod is caught by a release member K of a lock mechanism R to be described later. The headrest is configured such that, when a vehicle is crashed from behind, rear crash detection means (not shown) operates, the rod 36 is pushed up along with operation of the rear crash detection means, to thus activate the release member K, thereby unlocking the lock mechanism R.

The support plate 24 of the headrest 3 will now be described. The support plate 24 is assembled to be linked to the base member 20 by means of a link mechanism (e.g. a three-point link mechanism) involving use of a thick link plate 30. The three-point link mechanism is described in detail. Both ends in the width direction, at one side (a rear side), of the link plate 30 are rotatably attached to upper right and left portions of the base member 20 by a pin P1. Similarly, both ends in the width direction, at the other side (a front side), of the link plate 30 are rotatably attached to upper right and left portions of the support plate 24 by a pin P2.

The base member 20 is formed with elongated holes 20a extending substantially in the vertical direction at lower right and left portions thereof. A joint pin 32 is fixedly attached to a back side of the support plate 24 so as to laterally extend across the support plate 24. The joint pin 32 is movable within the elongated holes 20a formed in the base member 20. Accordingly, the three-point link mechanism is configured by three points; that is, the pin P1 provided at one end of the link plate 30, the pin P2 provided at the other end, and the joint pin 32.

A first tension spring 51 (shown only in FIG. 2) is hooked between the joint pin 32 and an upper side of the base member 20 (pin P1). The joint pin 32 is thereby urged toward upper ends of elongated holes 20a of the base member 20; that is, the support plate 24 kept being urged in an upper front direction with respect to the base member 20.

The lock mechanism R will be described in detail by reference to FIGS. 8A and 8B. The clock mechanism R includes the release member K, a pole 61 and a hook 62. The pole 61 is provided to the base member 20 rotatably, and urged in a clockwise direction by a pole spring 63. The release member K is provided to the base member 20 rotatably and is capable of rotating the pole 61 in the counterclockwise direction against an urging force by the pole spring 63. The hook 62 is provided to the base member rotatably, and urged in a counterclockwise direction by a hook spring 64. The hook 62 has a first engagement part which is engageable with the pole 61 and a second engagement part which is engageable with the joint pin 32. As shown in FIG. 8A, when the lock mechanism R is locked, the pole 61 engages with the first engagement part of the hook 62 to regulate the rotation of the hook 62 against an urging force by the hook spring 64, so that the second engagement part of the hook 62 is held engaging with the joint pin 32 to lock the joint pin 32 at the lower ends of the elongated holes 20a. Upon the release member K is activated to rotate the pole 61, the engagement between the pole 61 and the first engagement part of the hook 62 is released. Then, the hook 62 is rotated in the counterclockwise direction by the urging force of the hook spring 64, thereby releasing the lock of the joint pin 32, and the join pin 32 moves toward upper ends of the elongated holes 20a as shown in FIG. 8B.

In a normal time when a vehicle is not crashed from behind, the joint pin 32 is locked (held by lower ends of the respective elongated holes 20a) by the lock mechanism R as shown in FIG. 8A such that the support plate 24 is integral with the base member 20, that is, the support plate 24 is not protruded from the based member 20. Hereinafter, this state of the headrest 3 is referred to as a "normal state of the headrest 3". As described above, when the lock mechanism R is unlocked, the joint pin 32 moves from the lower ends of the respective elongated holes 20a toward the upper ends by urging force of the first tension spring 51 as shown in FIG. 8B. The link mechanism operates along with movement of the joint pin 32, whereupon the support plate 24 springs out (protrudes) toward the back of the passenger's head from the base member 20.

Ratchets 40 are formed integrally on a surface of the link plate 30 facing the base member 20 (a lower surface of the link plate 30) in the width direction. For example, two steps 40a and 40b are formed in an outer periphery of each of the ratchets 40. In the meantime, a stopper 50 capable of engaging with the steps 40a and 40b is rotatably attached to the base member 20. A second tension spring 52 is hooked between a rear end 50b of the stopper 50 and the lock mechanism R.

The second tension spring 52 is hooked at a position where a direction of the urging force to the stopper 50 can be changed. Specifically, the second tension spring 52 is switchably hooked such that the stopper 50 can be urged in a first rotating direction in which the stopper 50 engages with the steps 40a and 40b of the ratchets 40 (a clockwise direction in FIG. 2) and, conversely, that the stopper 50 can also be urged in a second rotating direction (a counterclockwise direction in FIG. 2) opposite to the first rotating direction. In other words, the stopper 50 is provided to be switchable between a first state in which the stopper is urged in the first rotating direction to engage with the steps 40a and 40b of the ratchets 40, and a second state in which the stopper is urged in the second rotating direction opposite to the first rotating direction.

During the course of this switch of the states, a line extending in the direction of the urging force to the stopper 50 from the position where the second tension spring 52 is hooked passes a rotation axis (dead point) about which the stopper 50 rotates, so that the direction of the urging force to the stopper 50 can be switched between the first rotating direction and the second rotating direction.

The stopper 50 is formed with a hook portion 50c which can interfere with the second steps 40b of the ratchets 40 when the urging direction to the stopper 50 is the second rotating direction. Accordingly, the stopper 50 is urged in the first rotating direction in the normal state of the headrest 3. The ratchets 40 and the stopper 50 are an example of return prevention mechanism.

Operation of the above-described headrest 3 will now be described. Spring out of the support plate 24 will first be described. When a vehicle is crashed from behind in the normal state of the headrest 3 shown in FIG. 2, the lock mechanism R is unlocked as described above, and the three-point link mechanism operates along with the unlocking operation, whereupon the support plate 24 springs out toward the back of the passenger's head (see FIG. 3). Since a front end 50a of the stopper 50 moves along an outer periphery of the ratchets 40 to move below the steps 40a and 40b of the ratchets 40. Therefore, the spring out of the support plate 24 is not regulated by the stopper 50.

Even when the support plate 24 is pushed back by the load imposed by the back of the passenger's head after the support plate 24 has fully sprung out, the front end 50a of the stopper 50 engages with the first steps 40a of the ratchets 40. Therefore, the support plate 24 can not be returned to its initial position before springing out (see FIG. 4). The same also applies to a case where the support plate 24 is pushed back by the load imposed by the back of the passenger's head in the course of the support plate springing out. Specifically, since the front end 50a of the stopper 50 engages with the second steps 40b of the ratchets 40, the support plate 24 can not be returned to its initial position before springing out.

Operation for returning the support plate 24 thus sprung out will now be described. First, there is performed operation such that a rear end 50b of the stopper 50 is oriented from downward to upward. This operation is performed, for example, by inserting a tool C or the like, into the headrest 3 from below. The urging direction to the stopper 50 is switched from the first rotating direction to the second rotating direction, and the front end 50a of the stopper 50 is pressed against a stopper press section 20b (not shown in FIG. 5) formed on the base member 20, thereby making it possible to hold the front end 50a of the stopper 50 disengaged from the first steps 40a of the ratchets 40 (see FIG. 5).

The support plate 24 is returned, while keeping in this state, to its initial position before springing out, the first steps 40a of the ratchets 40 interfere with the hook potion 50c of the stopper 50 (see FIG. 6), whereby the urging direction to the stopper 50 is returned from the second rotating direction to the first rotating direction (see FIG. 7), and the front end 50a of the stopper 50 is returned to the state of being pressed against the outer peripheral surface of the ratchet 40 (see FIG. 2). Accordingly, the support plate 24 can be returned to the normal state of the headrest 3.

The headrest 3 of the first exemplary embodiment of the present invention is configured as described above. According to this configuration, when performing operation for returning the support plate 24, the operator can hold the support plate by means of restoration force of the second tension spring 52 without holding the support plate released from regulation by the stopper 50 by one hand. Therefore, operation does not require both hands, so that operability in return operation becomes improved. As a result, it becomes possible to easily perform operation for returning the thus-sprung-out support plate 24.

Moreover, according to the above-described configuration, the urging direction to the stopper 50 can be returned along with operation for returning the support plate 24. Therefore, it is not necessary to separately perform operation for returning the stopper 50.

Second Exemplary Embodiment

Figure 9:
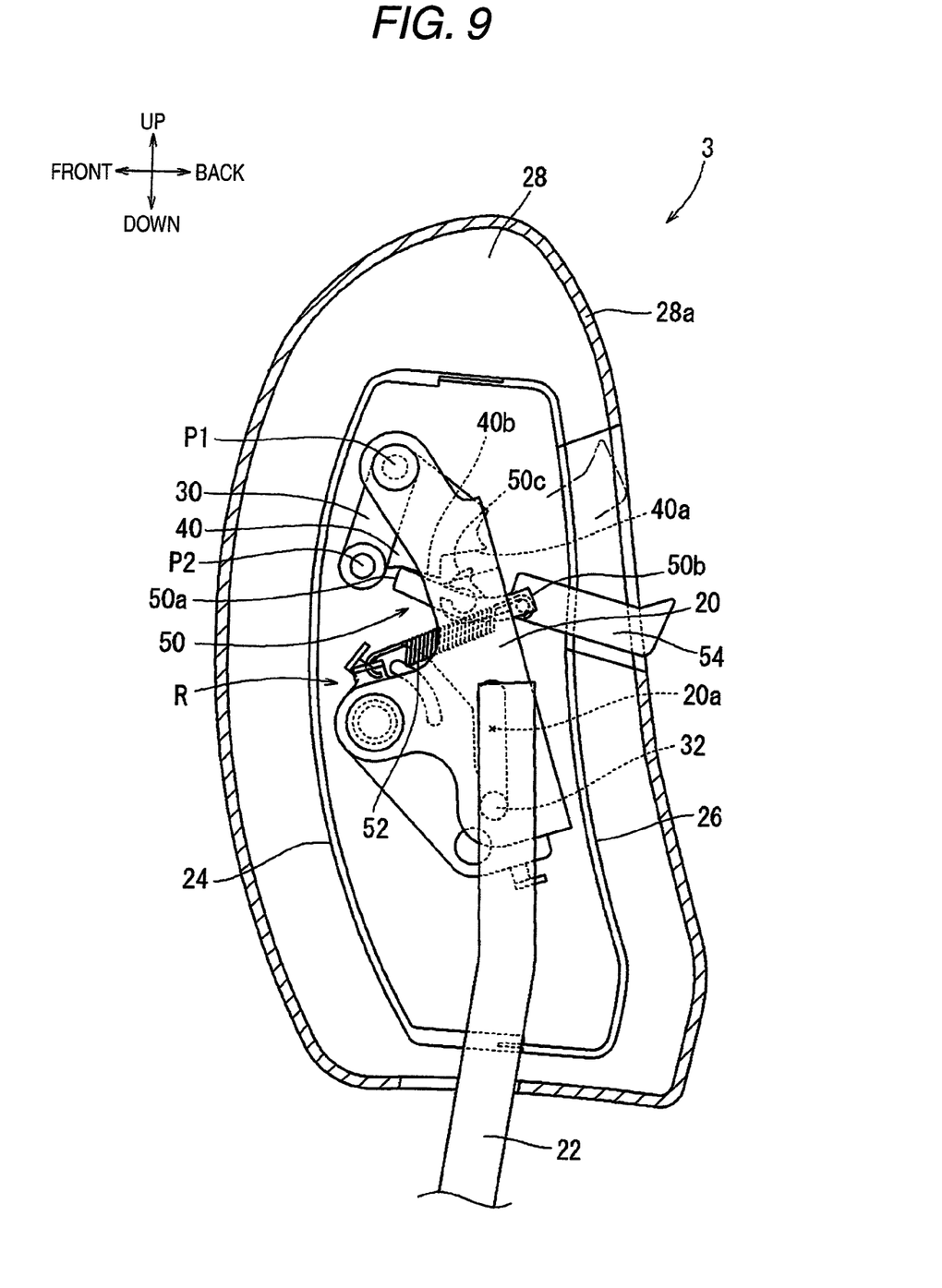
FIG. 9 is a side view showing a normal state of a headrest according to a second exemplary embodiment of the present invention.

A second exemplary embodiment of the present invention will now be described by reference to FIG. 9. FIG. 9 is a side view schematically showing a normal state of a headrest of the second exemplary embodiment. The second exemplary embodiment is for readily switching the urging direction to the stopper 50 as compared with the above-described first exemplary embodiment. In the following description, members that are identical with or equivalent to those described in the first exemplary embodiment are assigned the same reference numerals in the drawings, and their repeated explanations are omitted.

An operation section 54 that enables performance of operation for switching the urging direction to the stopper 50 from the outside of the base member 20 is provided on the stopper 50. Specifically, the stopper 50 is configured such that the rear end 50b of the stopper projects out of the rear cover 26 and the pad member 28. The urging direction of the stopper 50 can be switched by direct actuation of the operation section 54.

The headrest 3 of the second exemplary embodiment of the present invention is configured as described above. According to this configuration, the urging direction of the stopper 50 is switched from the first rotating direction to the second rotating direction, switching can be performed by actuation of the operation section 54 without use of a tool, or the like, as described in connection with the first exemplary embodiment. Therefore, the switching operation can be readily performed.

While the present invention has been shown and described with reference to certain exemplary embodiments thereof, it will be understood by those skilled in the art that various changes in form and details may be made therein without departing from the spirit and scope of the invention as defined by the appended claims.

For example, in the above-described exemplary embodiments, the second tension spring 52 is extended between the rear end 50b of the stopper 50 and the lock mechanism R. However, the second tension spring is not restricted to this configuration. The second tension spring 52 may also be extended between the rear end 50b of the stopper 50 and the back of the support plate 24. Further, the second tension spring may be replaced by any member which can urge the stopper switchably in the first rotating direction and the second rotating direction.

What is claimed is:

1. A headrest comprising:
a base member assembled to a seat back;
a support plate assembled to the base member by a link mechanism;
a lock mechanism which is unlocked when a vehicle is crashed from behind so that the link mechanism operates along with an unlocking operation of the lock mechanism, whereupon the support plate springs out to receive a back of a passenger's head;
a return prevention mechanism configured to prevent the support plate from returning to an initial position thereof achieved before the support plate springs out, by a load imposed by the back of the passenger's head during the course of the support plate springing out,
wherein the return prevention mechanism includes:
a ratchet including a step at an outer peripheral surface there; and
a stopper rotatably attached to the base member configured to engage with the step of the ratchet,
wherein the stopper includes a hook portion, and
wherein the stopper is provided to be switchable between a first state in which the stopper is urged in a first rotating direction to engage with the step of the ratchet and a second state in which the stopper is urged in a second rotating direction opposite to the first rotating direction, and
wherein after the support plate has sprung out, while performing an operation for returning the sprung-out support plate to the initial position thereof, by switching an urging direction of the stopper from the first rotating direction to the second rotating direction, the step of the ratchet interferes with the hook portion of the stopper, whereupon the urging direction of the stopper switches from the second rotating direction to the first rotating direction.

2. The headrest according to claim 1,
wherein the return prevention mechanism further includes a tension spring which urges the stopper switchably in the first rotating direction and the second rotating direction.

3. The headrest according to claim 2,
wherein the tension spring is hooked at an end of the stopper and applies an urging force in the urging direction, and
wherein the stopper is attached to the base member rotatably about a rotation axis between the first state and the second state while a line extending in the urging direction from the end of the stopper at which the tension spring is hooked passes the rotation axis.

4. The headrest according to claim 1,
wherein the stopper has an operation section configured to switch the urging direction of the stopper from an outside of the base member.

5. A headrest comprising:
a base member assembled to a seat back;
a support plate provided to the base member movable relative to the base member by a link mechanism;
a first spring which urges the support plate frontward;
a lock mechanism which regulates movement of the support plate, wherein in a lock state, the support plate is regulated at an initial position, and in an unlock state, the support plate is moved toward a frontward position by an urging force of the first spring;
a return prevention mechanism including:
a ratchet movable along with the support plate,
a stopper having a hook portion which is rotatably attached to the base member and configured to move to an interference position to interfere with the ratchet to regulate movement of the support member from the frontward position to the initial position, and
a second spring which urges the stopper switchably in a first rotating direction toward the interference position and a second rotating direction opposite to the first rotating direction,
wherein after the support plate is urged frontward, while performing an operation for returning the frontward urged support plate to the initial position thereof, by switching an urging direction of the stopper from the first rotating direction to the second rotating direction, the ratchet interferes with the hook portion of the stopper, whereupon the urging direction of the stopper switches from the second rotating direction to the first rotating direction.

* * * * *